March 16, 1965  SHOJI KOBAYASHI  3,173,176
ROTARY INJECTION MOULDING MACHINE
Filed Sept. 11, 1962  2 Sheets-Sheet 1
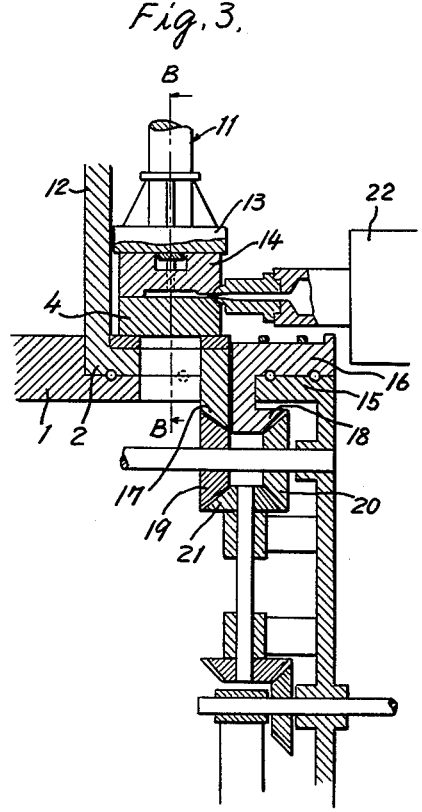
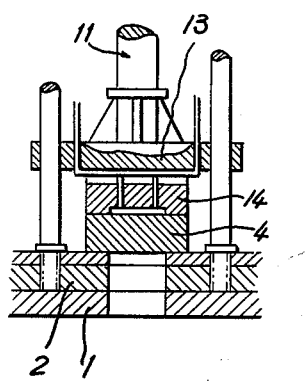
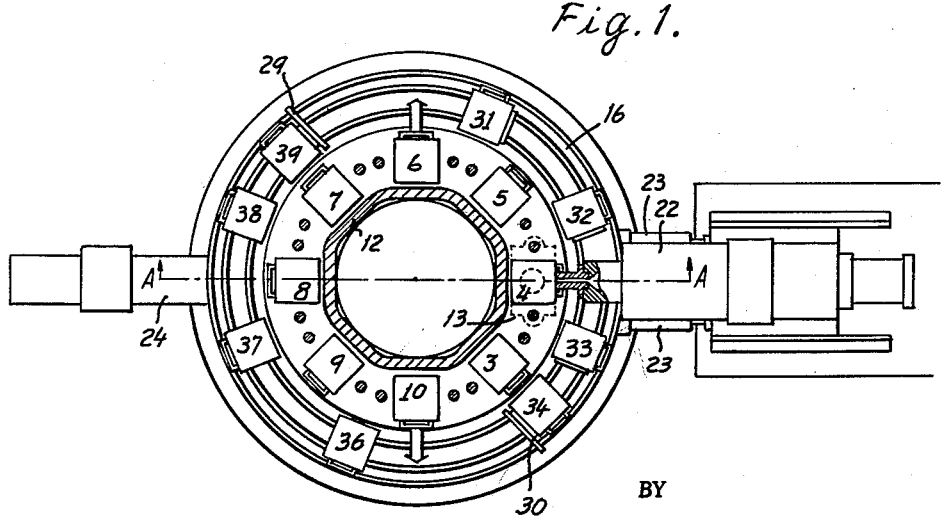

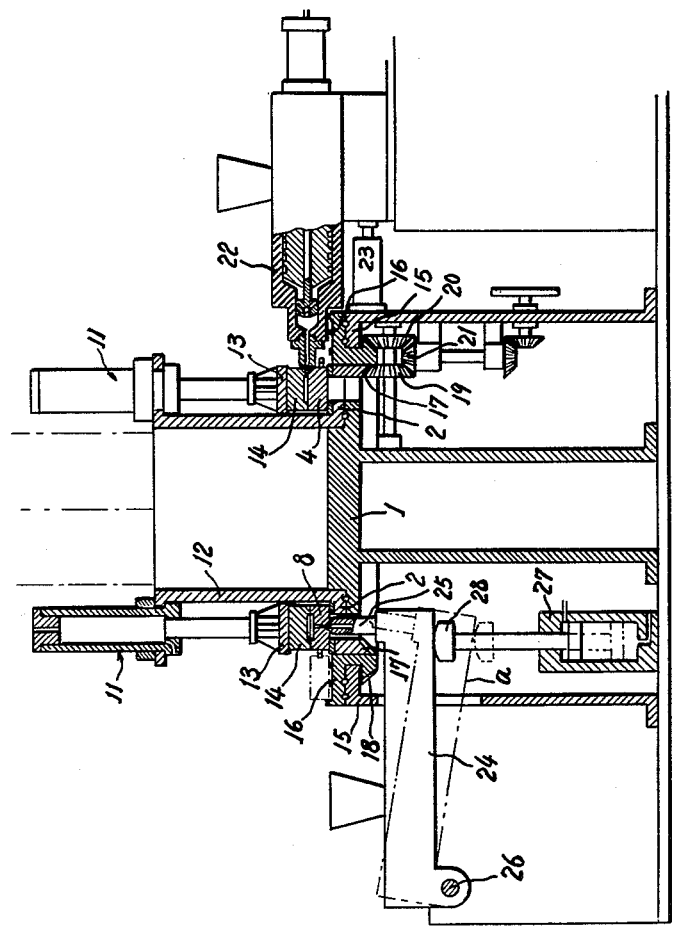

United States Patent Office 3,173,176
Patented Mar. 16, 1965

3,173,176
ROTARY INJECTION MOULDING MACHINE
Shoji Kobayashi, 1405 Oaza-Ryoke, Urawa, Japan
Filed Sept. 11, 1962, Ser. No. 222,831
Claims priority, application Japan, Sept. 18, 1961, 36/33,164
3 Claims. (Cl. 18—30)

This invention relates to the continuous, commercial scale production of injection moulded products with two different colours of two different materials, for example, numeral marks of telephone dials and typewriter keys or like, with improvements in the moulding efficiency and the quality of products thereby obtained.

In the past, the manufacture of injection moulded products with two different colours or materials has been made according to the following procedures. An injection moulded product, formed in a moulding die during a first moulding step, is removed from the moulding die. The moulded product is then reversely inserted into a separate moulding die for a second moulding, so as to be subjected to different colour injection moulding at the second step which is not associated with the first step. Thereafter, the resultant two-colour or different material moulding is taken out. Such procedures, therefore, not only make the operation extremely inefficient, since the first step is not mechanically associated with the second step, thereby necessitating separate handling, but also tend to deform the product moulded in a first colour or material while it is removed from the mould. In addition, such procedures inevitably damage the product while it is pressed into the moulding die for the second moulding whereby making it inavoidable to produce many defective products.

The present invention is characterized by the provisions of a plurality of die clamping mechanisms mounted on a circular annular rotatable disc at equal angular intervals therearound. Each of these clamping mechanisms is provided with an upper moulding die, and the clamping mechanisms are intermittently rotated, or stepped angularly, along with the rotary disc. A plurality of lower moulding dies, equal in number of the die clamping mechanisms on the rotary disc, is provided, and half of the lower moulding dies are used for the first moulding operation and the rest for the second moulding operation. An injection mechanism for the moulding material for the first moulding operation is provided at a specific location facing toward the upper moulding die, and an injection mechanism for the second moulding operation is positioned diametrically opposite the injection mechanism for the first moulding operation and arranged to inject moulding material into the lower moulding dies.

Due to the intermittent rotation of the rotary disc, the injection moulded product made by the first moulding operation, together with the upper moulding die, is intermittently stepped angularly while the product is maintained within the upper moulding die. This angular stepping is continued until the product moulded by the first moulding operation is transferred to a second position at which the second moulding operation is effected after the initial lower moulding die has been replaced by a fresh die to produce the desired two-colour or different-materials moulded product. The finished moulded product is then removed from the mould without any damage being effected on the finished product.

In addition to the above, the invention apparatus provides an annular transfer conveyor surrounding the rotary disc and intermittently rotatable in the opposite direction in coordination with the disc. This annular conveyor is provided with stops against which lower moulding dies transferred to the annular conveyor abut when they are in position to be reused in a respective moulding operation. These stops are locted at the boundary between the first and second moulding operations, and thus enhance the efficiency of the moulding operation.

Furthermore, the injection mechanism for the first moulding operation is located to the side of the upper moulding die so as to inject a raw material for moulding from the side of the moulding die, and the opposite second injection mechanism is located in the lower surface of the lower moulding die so as to upwardly inject another raw material from the lower surface of the lower moulding die for the purpose of increasing the speed, ease and efficiency of the moulding operation.

In case of preparing two-colour moulded product, such as numeral marks of a dial, or of preparing different material moulded products comprising a transparent upper layer and a heat-resisting lower layer, respectively, it is necessary to employ a suitable moulding die for individual cases.

FIG. 1 is a plan view of one embodiment of rotary injection moulding apparatus according to the invention, with the die clamping mechanisms being removed;

FIG. 2 is a longitudinal elevational view, with part in section alone in the line A—A of FIG. 1, and with certain detailed parts omitted;

FIG. 3 is an enlarged partial sectional view of the injection mechanism for the first moulding operation; and FIG. 4 is an enlarged partial sectional view of a portion of the injection mechanism for the first moulding operation, taken along the line B—B of FIG. 3.

Referring to FIG. 1 to FIG. 4, the apparatus of the invention includes a rotary annular disc 2 arranged to be freely rotatable with its inner circumference in engagement with the outer circumference of a round shaped base 1 which is secured on a floor. On the upper surface of the said rotary disc 2, a plurality (for example, 8 pieces) of lower moulding dies are removably fitted in positions as indicated in numeral Nos. 3 to 10 at intervals of equal angular extent. To simplify the explanation, the lower moulding dies positioned as at from numerals 3 to 10 are called lower moulding dies 3 to 10, respectively. These lower moulding dies are divided in use so that the dies at positions 3 to 6 are used for the first moulding and the dies at position 7 to 10 for the second moulding. Since the injection moulding at the first step is effected from the side of the upper moulding die, as shown in the drawing, and the injection moulding at the second step is effected from the lower surface of the lower moulding die 8, cavities are not provided for each lower die for the first step positioned at from 3 to 6, but only for lower dies for the second step positioned at from 7 to 10. Eight die-clamping mechanisms 11 equal in number to and opposed to the lower moulding dies positioned as mentioned above at from 3 to 10 are vertically fitted on an octagonal cylindrical member 12 constructed integrally with the rotary disc 2. The lower ends of the vertical rods of each die-clamping mechanism are made as vertically movable discs 13, the lower surface of each of which is removably secured to an upper molding die 14. Each upper moulding die has the same shape, and the outer surface thereof is formed with a gate for injection of raw material. An annular base 15 is spaced a small radial distance from the outer periphery of circular base 1. The upper surface of annular base 15 carries an annular conveyor 16 for transferring the lower moulding dies, the annular conveyor riding on ball bearings. There are two rows of ball bearings provided.

The said rotary disc 2 and annular conveyor 16 are intermittently rotated relative to each other in opposite directions. For this purpose, rotary disc 2 has a downward extension of the outer periphery thereof. The radial inner surface of this downward extension is formed with bevel gear teeth 17 meshing with a bevel gear 19. The annular conveyor 16 also has a downward extension, and this downward extension is on the inner periphery of the conveyor 16. The lower end of the extension of the conveyor 16 is provided, on its inner face, with bevel gear teeth 18 which mesh with a bevelled gear 19. The bevel gears 19 and 20 are secured to a common driving bevel gear 21, which is driven by means of an intermittently rotatable external prime mover (not shown in the drawing) to intermittently rotate the rotary disc 2 and the conveyor 16 in opposite directions. As to this rotating means, the lower end of the vertical rotating shaft of the driving bevel gear 21 is fitted a horizontal bevel gear which is engaged with a vertical bevel gear connected to an external prime-mover mechanism by means of a pulley.

Regarding the injection moulding mechanism at the first step, an injection mechanism 22 required to inject raw material for the first moulding is horizontally located outside the dies at position 4 of the lower moulding dies on the rotary disc 2. The nozzle of the injection mechanism is brought into contact with the side gate of the upper moulding die positioned at 4 only when injection is made, and it is withdrawn after completion of the injection. Numeral 23 is a hydraulic mechanism by means of which the forward and backward movement of the nozzle is effected, but the action of this mechanism can be optionally selected.

FIG. 1 and FIG. 2 generally illustrate the whole construction as mentioned hereinabove, and FIG. 3 and FIG. 4 are enlarged views showing the connection between the rotary disc 2 and the annular conveyor 16 and the relation between the lower moulding die and the raw material injection mechanism, respectively.

Referring to the injection moulding mechanism for the second step, each lower moulding die positioned at from 7 to 10 is perforated with a gate on the lower surface thereof, since injection mechanism is pressed into the lower surface of the lower die to inject the raw material for moulding thereinto. An injection mechanism with an upwardly directed nozzle 25 is located facing against the gate of the lower moulding die positioned at 8. This injection mechanism is of a horizontal type, and is pivoted by a pivot pin 26 at its outer end and supported by an upper end 28 of the piston rod of the hydraulic mechanism 27 at the lower surface of the inner end thereof. The lower end of the injection mechanism is normally lowered by its own weight about the pivot pin 26 as shown by the broken line a in FIG. 2 to keep the nozzle 25 from the gate formed in the lower surface of the lower moulding die 8, whereby the rotary disc 2 may be turned freely.

Referring to the annular conveyor 16, on the conveyor 16 are symmetrically fitted stoppers 29 and 30 which are located on the portions opposite to the positions 3 and 7 where the lower moulding die 3 and lower moulding die 7 are inserted respectively. Of the moulding dies withdrawn on the annular conveyor 16 at positions 6 and 10 and transferred, the lower moulding dies 3 to 6 are stopped by means of the stop 30 and the lower moulding dies 7 to 10 by means of the stop 29, to simplify their insertion onto the rotary disc 2. The numerals 31, 32, 33 and 34 show the positions and the condition of the lower moulding die while it is transferred on the conveyor after completion of the first moulding, and the numerals 36, 37, 38 and 39 show the positions and condition of the upper moulding die while it is transferred on the conveyor after completion of the second moulding.

Hereinabove is described the construction of this invention, now its operation will be explained followingly.

In carrying out the moulding operation according to this invention, at first a lower moulding die is inserted at position 3 on the rotary disc 2 and then shifted by intermittent rotation of the rotary disc 2 to position 4, at which the die-clamping mechanism located above 11 is actuated to lower and clamp with pressure the uper die 14 on the lower die 4. Concurrently with the clamping of the dies, injection mechanism 22 is advanced by the action of the hydraulic mechanism 23 so as to bring its nozzle tip into contact with the gates of the said moulding die, thereby to effect injection of raw material for the first moulding as shown in FIG. 1 and FIG. 2. On completion of the said injection, the hydraulic mechanism is allowed to actuate reversely thereby to move back the injection mechanism with its nozzle disconnected from the moulding die. Then, the rotary disc 2 is further intermittently rotated to transfer the moulding die, after completion of the first moulding operation and with the upper and lower dies kept closed, to the next position 5, where the rotary disk is stopped for a short time. Then, the closed moulding die which has been transferred to the position 5 is transferred by further intermittent rotation of the rotary disc 2 while it is kept in closed condition. While the rotary disc stops at the position 6 for a short time, the upper moulding die 14 is opened and the lower moulding die is withdrawn on the conveyor 16. Namely, the injection for the first moulding is repeated for the lower moulding die only at the position 4, and the lower moulding die injected with the raw material is cooled while it is intermittently transferred from the position 4 to the position 6.

As hereinbefore described, the upper die 14 opened at the position 6 and having the first moulded product kept in moulding condition therein, is transferred from position 6 to position 7, where the second step is effected, by succeeding intermittent rotation with stops for a short time. During this short time, a vacant lower die 7 for the second moulding is inserted below the upper die 14 (i.e., the lower die is replaced). By further intermittent rotation, the upper and lower dies 14 and 7 are transferred to the position 8 and clamped together by the action of the die-clamping mechanism 11. At the same time, the second injection mechanism 24 is lifted by means of the hydraulic mechanism 27 to bring its nozzle tip 25 into contact with the gate formed in the lower surface of the lower die 8 closed tightly, through which raw material for the second moulding is injected.

After completion of the injection, by releasing the oil pressure inside of the hydraulic mechanism 27, the forward end of the injection mechanism 24 is lowered by its own weight to disconnect the nozzle 25 from the gate of the lower moulding die 8. Thereafter, the upper and lower dies kept in closed condition are transferred to the next position 9 by intermittent rotation. Then, by further intermittent rotation, the dies kept in closed condition are transferred to a position 10 for final second step, while the moulded product is chilled. While the dies stop at position 10 for a short time, the upper die 14 is opened by pushing its knock pin down, leaving the moulded product in the lower die 10. Then, by drawing out the lower die 10 attached with the moulded product on the conveyor 16 and taking out the product, a two-colour or different material moulded product is obtained.

At the first step, the lower die thus employed is withdrawn on the conveyor 16 in front of the position 6 on the rotary disc, and transferred as vacant lower die 31 by the intermittent rotation, the direction of which is opposite to that of the rotary disc in sequence 32–33–34, stopped by a stop 30 and inserted at the position 3 ready for the next moulding. Thereafter same process as mentioned above is continuously and semi-automatically repeated. Also at the second step, the lower die is withdrawn on the conveyor 16 at the position 10 on the rotary disc. The vacant lower die 36 is transferred by intermittent rotation in sequence 37–38–39, stopped by a stop 29, and inserted at the position 7 ready for the next moulding. Thereafter the die can be semiautomatically and continuously used.

According to this invention, therefore, it is possible to form semi-automatically and continuously a product of the first moulding, and a product of the second moulding or a finished product every time the intermittent rotation stops, if operators attend at the both positions of the stopper 29 and 30. That is to say, this invention has such a great advantage as being capable of effecting extremely simple and rapid large scale production of desired two-colour or different material mouldings.

Since a product of the first moulding, according to this invention, is held in the upper die as it is without being taken out from the die and transferred to the position for the second moulding and taken out from the die after completion of the whole injection moulding, the product obtained is very excellent and has no such defects as the prior product may have. This invention, accordingly, can make the cost of the product remarkably low with enhanced large scale productivity.

What I claim is:

1. A rotary injection moulding machine comprising, in combination, a substantially circular disc; means mounting said disc for rotation about a substantially vertical central axis; a plurality of mould stations arranged at equi-angularly spaced positions on said disc; a plurality of lower mould members equal in number to said stations; said lower mould members being divided into numerically equal groups of first and second lower mould members; a plurality of vertically oriented mould clamping mechanisms equal in number to said stations; means supporting each mechanism in vertical alignment with a respective station; an upper mould member carried by each mechanism for clamping to a lower mould member in the associated station; a circular conveyor radially juxtaposed with said disc for rotation about said axis; means rotating said disc and said conveyor in opposed directions about said axis; first and second injection means disposed at diametrically opposite positions with respect to the path of travel of said disc; means for reciprocating said first injection means radially toward and away from said disc; means for moving said second injection means in a vertical direction toward and away from said disc; said upper mould members and said first lower mould members being formed to conjointly provide, when clamped to each other, a laterally opening gate for cooperation with said first injection means; said second lower mould members being formed to close said upper mould members, when clamped thereto, and with a vertically opening gate cooperable with said second injection means; first and second stops positioned substantially diametrically opposite each other and extending across said conveyor for abutment by lower mould members moving along said conveyor; said first and second stops separating said first lower mould members from said second lower mould members; said first stop being positioned, with respect to the direction of rotation of said disc, by a distance in advance of said first injection means such that, when a station on said disc is aligned with said first injection means, the succeeding station on said disc is aligned with a first lower mould member engaged with said first stop and positioned on said conveyor; said second stop being correspondingly positioned relative to said second injection means and said second lower mould members; said rotating means interrupting rotation of said disc and said conveyor as a pair of diametrically opposite stations on said disc are aligned, respectively, with said first injection means and said second injection means.

2. A rotary injection moulding machine, as claimed in claim 1, in which said conveyor is annular and is juxtaposed with the external periphery of said circular disc.

3. A rotary moulding machine, as claimed in claim 1, in which said second injection means is vertically oscillatable about a substantially horizontal axis adjacent the inactive end thereof; whereby said second injection means will drop away from said disc by gravity; and actuating means arranged to swing the free end of said second injection means into operative engagement with a second lower mould member on said disc.

References Cited by the Examiner

UNITED STATES PATENTS 3,016,669　1/62　Grosclaude _____ 18—5
3,031,722　5/62　Gits _____ 18—59

OTHER REFERENCES

German specification DAS 1,072,799, January 7, 1960.

WILLIAM J. STEPHENSON, *Primary Examiner.*

ROBERT F. WHITE, MICHAEL V. BRINDISI,
　　　　　　　　　　　　　　　　*Examiners.*